(12) United States Patent
Preston et al.

(10) Patent No.: US 8,498,815 B2
(45) Date of Patent: Jul. 30, 2013

(54) SYSTEM, METHOD AND APPARATUS FOR COMMUNICATING POSITION DATA

(75) Inventors: Steven Gordon Preston, Winter Springs, FL (US); Thomas Hans Penner, Apopka, FL (US); Edward Steve Kaprocki, Debary, FL (US)

(73) Assignee: Lockheed Martin Corporation, Orlando, FL (US)

( * ) Notice: Subject to any disclaimer, the term of this patent is extended or adjusted under 35 U.S.C. 154(b) by 2000 days.

(21) Appl. No.: 11/340,264

(22) Filed: Jan. 26, 2006

(65) Prior Publication Data
US 2009/0201199 A1   Aug. 13, 2009

Related U.S. Application Data

(60) Provisional application No. 60/647,243, filed on Jan. 26, 2005.

(51) Int. Cl.
*G01C 21/30* (2006.01)

(52) U.S. Cl.
USPC ......... 701/469; 701/519; 340/988; 455/456.1

(58) Field of Classification Search
USPC .................................. 701/213, 214, 215, 216
See application file for complete search history.

(56) References Cited

U.S. PATENT DOCUMENTS 6,798,356 B2 *   9/2004  Flick .............................. 340/989
2002/0142783 A1 * 10/2002  Yoldi et al. ..................... 455/456

* cited by examiner

*Primary Examiner* — Helal A Algahaim
(74) *Attorney, Agent, or Firm* — Withrow & Terranova, PLLC

(57) ABSTRACT

A method on a computer unit for calculating and transmitting position data is disclosed. The method includes monitoring motion of the unit. If motion of the unit is detected, the method further includes initiating a start sequence of the unit, calculating current position data of the unit using the Global Positioning System (GPS), calculating a difference between the current position data of the unit and a previous position data of the unit and transmitting the current position data of the unit if the difference is greater than a threshold value.

10 Claims, 9 Drawing Sheets

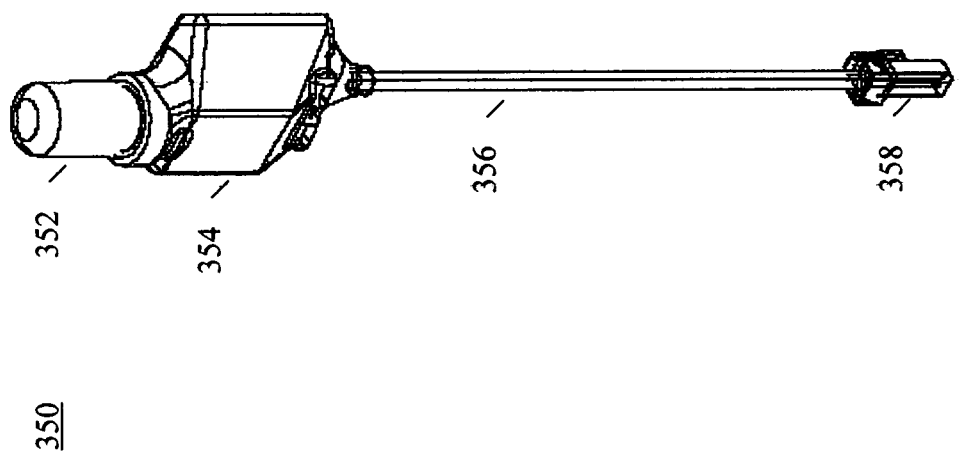

SYSTEM, METHOD AND APPARATUS FOR COMMUNICATING POSITION DATA

CROSS-REFERENCE TO RELATED APPLICATIONS

The present patent application claims priority to U.S. provisional patent application Ser. No. 60/647,243 filed on Jan. 26, 2005 and entitled "Security Forces Simulation Training System and Method." U.S. provisional patent application Ser. No. 60/647,243 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

This invention relates to position tracking, and more particularly to logging and communicating position data using mobile units.

BACKGROUND OF THE INVENTION

The Global Positioning System (GPS) is a worldwide satellite navigational system formed by approximately 24 satellites orbiting the earth and their corresponding receivers on the earth. The satellites orbit the earth at approximately 12,000 miles above the surface and make two complete orbits every 24 hours. The GPS satellites continuously transmit digital radio signals that contain data on the satellites location and the exact time to the earth-bound receivers. Based on this information the receivers know how long it takes for the signal to reach the receiver on earth. Various uses for GPS receivers have emerged over the years, from location tracking for drivers and hikers to flight tracking for aircraft. More recently, the U.S. military has implemented the use of GPS receivers, together with transmitters, on vehicles and soldiers on foot. These devices are used to log and communicate the position data of each GPS device to a central command which combines all such position data and creates a complete picture of all units and their locations.

One of the U.S. military's uses for such a communications network for exchanging position data is for realistic training exercises. For example, Multiple Integrated Laser Engagement System (MILES) is a military training system that provides a realistic battlefield environment for soldiers involved in training exercises. MILES provides tactical engagement simulation for direct fire force-on-force training using eye safe laser "bullets." Each individual and vehicle in the training exercise has a detection system to sense hits and perform casualty assessment. Laser transmitters are attached to each individual and vehicle weapon system and accurately replicate actual ranges and lethality of the specific weapon systems. MILES training has been proven to dramatically increase the combat readiness and fighting effectiveness of military forces.

Soldiers use MILES devices primarily during force-on-force exercises, from squad through brigade level, to simulate the firing and effects of actual weapons systems. These weapons systems include the M1 Abrams Tank, Bradley Infantry Fighting Vehicle, M113 Armored Personnel Carrier, wheeled vehicles and other non-shooting targets. Additionally, basic MILES simulations address anti-armor weapons, machine guns, rifles, and other ancillary items, such as a controller gun, within the program. Combat vehicles, support vehicles and individual solders are instrumented with a GPS receiver for position location determination and a transmitter for sending all recorded data back to central command. All player activity is recorded during an exercise. Position location, and direct and indirect fire event reporting is accomplished through the associated transmitter.

One of the restrictions on the mobile units used on individual soldiers and some vehicles is energy expenditure. These mobile GPS units run on battery power, which is finite and sometimes too short. As such, various aspects of the system often drain battery power rather quickly. One example is the periodic nature by which a GPS device determines position data, even if it has not moved since the last position determination. This can be redundant and wasteful of battery power. Another example of wastefulness of battery power is the periodic nature by which a GPS device transmits position data, even if it has not moved since the last transmission. This can also be redundant and wasteful. GPS devices also transmit position data periodically, even if direction and speed has not changed since the last transmission. This is not an optimal use of resources.

Another problem with the mobile units used during training exercises is radio attenuation and radio frequency (RF) reflections. Various environmental factors can affect the strength, path and overall structure of a radio signal. Varied terrain such as mountains, forests and hills can reduce signal strength and sometimes block the signal completely. Likewise, man-made structures such as building and vehicles can attenuate a radio signal and garble the information within it. Further, human bodies themselves can attenuate radio signals, which is a particular problem with GPS units and transmitters that are mounted on a foot soldier. One approach to the problem of human body attenuation is mounting the transmitter antenna on the head or helmet of the wearer. Although this works in some instances, mounting an antenna on a wearer's head can be unwieldy and uncomfortable for the individual. Further, although placement of the antenna in this location may promote reception and transmission when the wearer is standing up, this does not hold true when the individual is lying on the ground or in a prone position. Thus, in these positions the placement of the antenna on the wearer's head is not beneficial.

Therefore, a need exists to overcome the problems with the prior art as discussed above, and particularly for a more efficient way for logging and communicating position data.

SUMMARY OF THE INVENTION

Briefly, according to an embodiment of the present invention, a method on a computer unit for calculating and transmitting position data is disclosed. The method includes monitoring motion of the unit. If motion of the unit is detected, the method further includes initiating a start sequence of the unit, calculating current position data of the unit using the Global Positioning System (GPS), calculating a difference between the current position data of the unit and a previous position data of the unit and transmitting the current position data of the unit if the difference is greater than a threshold value.

In another embodiment of the present invention, a computer unit for calculating and transmitting position data is disclosed. The computer unit includes a motion detector for monitoring motion of the unit and a Global Positioning System (GPS) antenna for receiving GPS signals. The computer unit further includes a processor configured for initiating a start sequence of the unit, calculating current position data of the unit using received GPS signals and calculating a difference between the current position data of the unit and a previous position data of the unit, only if motion of the unit is detected. The computer unit further includes a transmitter for transmitting the current position data of the unit if the difference is greater than a threshold value.

In another embodiment of the present invention, a system on a computer is disclosed. The system includes a central controller for storing position data for a plurality of computer units, the central controller including a transmitter and a receiver. The system further includes at least one computer unit for calculating and transmitting position data, the computer unit including a motion detector for monitoring motion of the unit and a Global Positioning System (GPS) antenna for receiving GPS signals. The computer unit further includes a processor configured for initiating a start sequence of the unit, calculating current position data of the unit using received GPS signals and calculating a difference between the current position data of the unit and a previous position data of the unit, only if motion of the unit is detected. The computer unit further includes a transmitter for transmitting the current position data of the unit to the central controller if the difference is greater than a threshold value.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 3B is an illustration showing a perspective view of the GPS component in one embodiment of the present invention.

DETAILED DESCRIPTION

The present invention provides a computer unit for calculating and transmitting position data over radio frequency. The computer unit may include a motion detector for monitoring motion of the unit and a Global Positioning System (GPS) antenna, such as a double helix antenna, for receiving GPS signals. The computer unit further includes a processor that, if motion of the unit is detected, initiates a start sequence of the unit, calculates current position data of the unit using received GPS signals and calculates a difference between the current position data of the unit and a previous position data of the unit. The computer unit further includes a transmitter for transmitting the current position data of the unit if the difference is greater than a threshold value.

It can be costly in terms of expended energy to have mobile simulation units calculate GPS position data periodically. If a unit has not moved since the last calculation, it is redundant and wasteful of battery power. It can further be costly in terms of expended energy and bandwidth to have mobile simulation units transmit GPS position data periodically. If a unit's location has not changed since the last transmission, it is redundant and wasteful of battery power. Further, if a unit is traveling in a constant direction over a long period of time, it can can be redundant to transmit the direction data. The features of the present invention are beneficial as they allow for the transmission of compressed GPS position data only when movement occurs, so as to lighten the load on bandwidth and processing power of the units.

The features of the present invention are further advantageous as they allow for a savings in battery power in the mobile simulation units by limiting the calculation of GPS position to instances when movement occurs and by limiting the transmission of GPS position data. The present invention is further beneficial as it allows for a reduction in the use of bandwidth by limiting the transmission of GPS position data when movement occurs and by compressing GPs position data that is transmitted. Lastly, the present invention allows for more accurate calculation of GPS position data by calculating current GPS position data using previous GPS position data and a current GPS signal reading.

Figure 1:
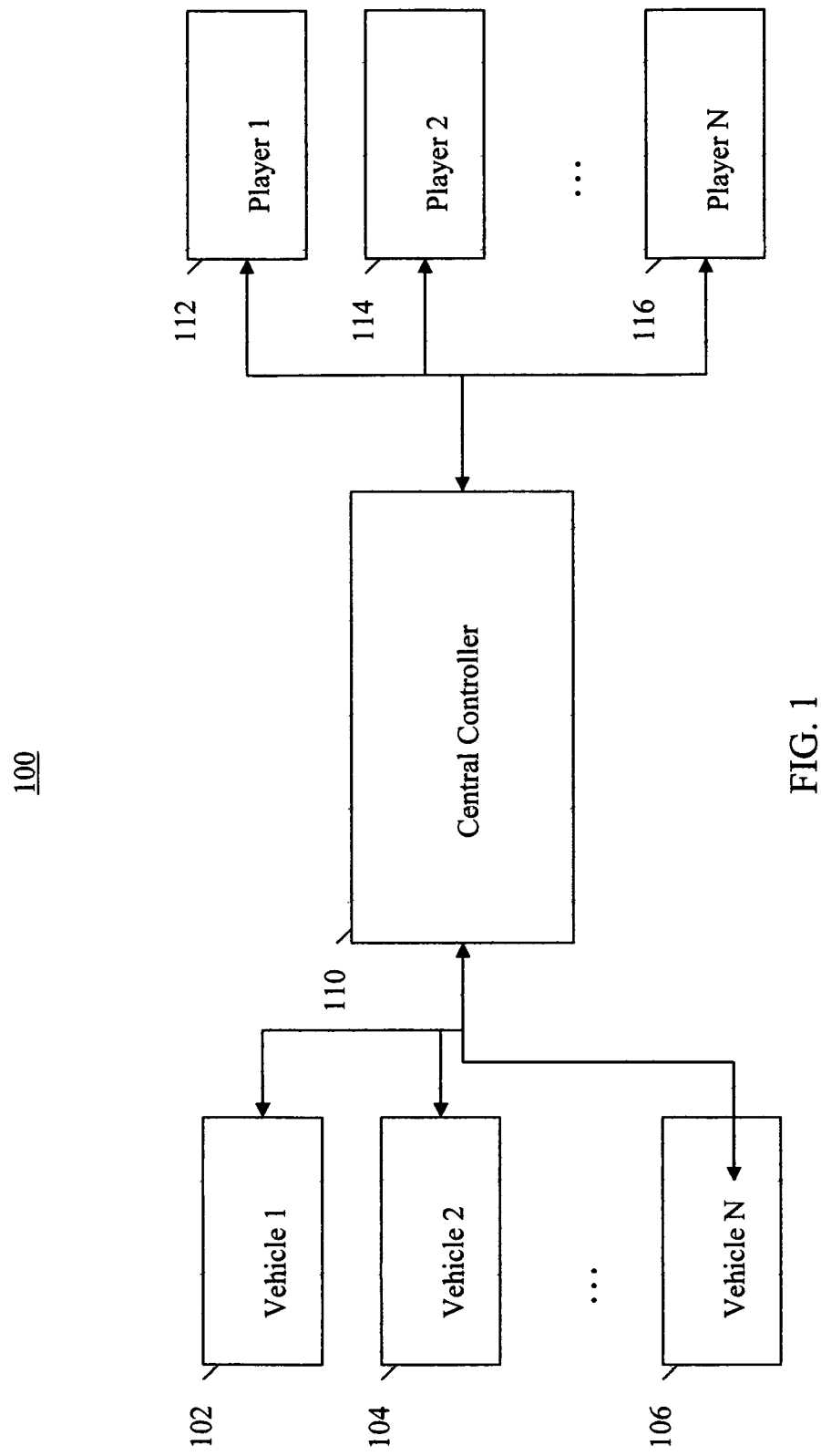
FIG. 1 is a block diagram showing the system architecture of a conventional radio-controlled military simulation system.

FIG. 1 is a block diagram showing the system architecture of a conventional radio-controlled military simulation system 100. The radio-controlled military simulation system 100 includes a plurality of vehicles 102, 104 through 106, such as tanks, jeeps, armored personnel carriers and heavy hauling equipment. The radio-controlled military simulation system 100 further includes a plurality of individuals 112, 114 through 116, representing soldiers and other individuals participating in the simulation. Each vehicle 102, 104, 106 and individual 112, 114 and 116 in the simulation system can interact with each other as well as with the central controller 110, which controls various aspects of the simulation via radio communication and records simulation information. The central controller 110 includes a radio communication system, as well as a computer network capable of tracking multiple participating entities, controlling various aspects of game play and storing various types of information regarding the simulation. See FIG. 8 and the accompanying description for a more detailed explanation of a computer system useful for implementing the central controller 110.

As explained above, each vehicle 102, 104, 106 and individual 112, 114 and 116 can be outfitted with a mobile simulation unit that can receive and transmit signals, infrared (IR) signals and radio frequency (RF) signals, for example, such as in the MILES simulation system used by the U.S. military for realistic combat training. The central controller 110 is further able to communicate with the vehicles 102-106 and individuals 112-116 via RF and IR signals. IR signals are typically used to indicate to a mobile simulation unit that the receiver has been injured, killed or otherwise compromised. RF signals are typically used to send a message or other information among mobile simulation units and/or the central controller 110. The MILES simulation system, for example, operates a 285-350 MHz or a 2.4 GHz RF communication system with a range of 10 km over a 20 km squared area.

RF signals can be used to exchange information among mobile simulation units during a simulation. For example, during game play mobile simulation units on individuals 112, 114 and 116 can each broadcast a personal identification (PID) code to indicate the identification of the player. Vehicles 102, 104 and 106 may also broadcast PIDs. In this manner, the central controller 110 may keep up to date on the locations and status of each vehicle 102-106 and player 112-116 in the simulation. The central controller 110 may also send various types of messages to entities participating in the simulation, such as a system command that resets the simulation or a game command that orders an entity to die or become resurrected.

A mobile simulation unit can send out an IR signal when, for example, a player 112 or a vehicle 102 fires a weapon. IR signals are suitable for line-of-sight simulation and are therefore used to simulate weapons firing. The transmission of an IR signal during firing of a weapon can include the PID of the firing entity, a weapon code indicating the type of weapon used and an injury code indicating the type of injury that would be sustained by the receiving entity in such a situation.

A mobile simulation unit may also include a GPS device that comprises a GPS receiver and processor that receives signals from the GPS satellites and calculates the global position of the device, typically in terms of a latitude and longitude. The mobile simulation unit may then transmit over RF to the central controller 110 or other players the position calculated by the GPS device. Details as to when the GPS device of the present invention, in contrast to a similar device of a conventional system, calculates and transmits the position is provided below with reference to FIGS. 5-7.

It should be noted that although FIG. 1 shows only three vehicles 102-106 and three individuals 102-106, a conventional radio-controlled military simulation system 100 may typically support high numbers (sometimes thousands) of entities participating in the simulation.

Figure 2:
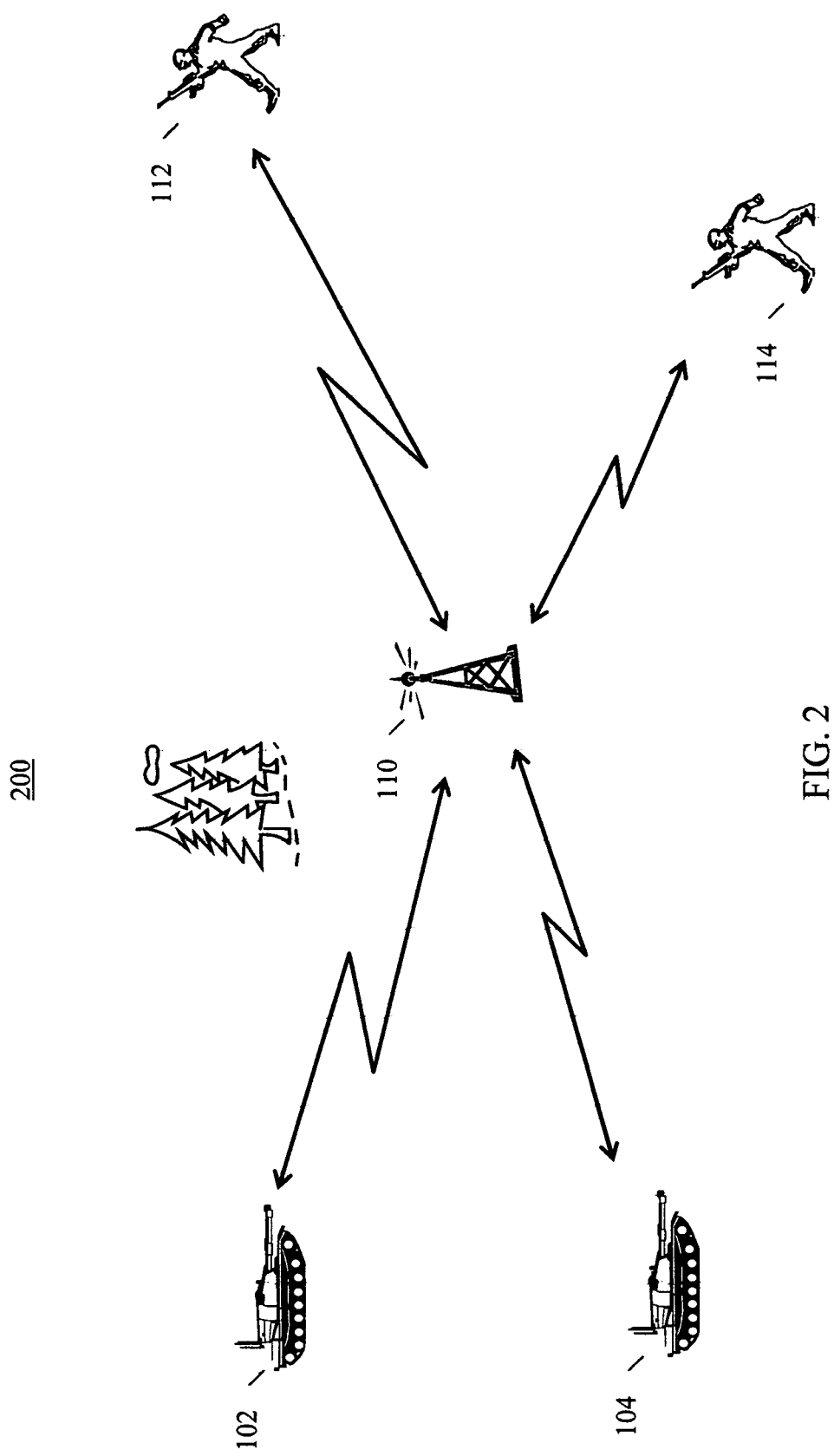
FIG. 2 is an illustration showing an outdoors implementation of the conventional radio-controlled military simulation system of FIG. 1.

FIG. 2 is an illustration showing an outdoors implementation 200 of the conventional radio-controlled military simulation system 100 of FIG. 1. The radio-controlled military simulation system 200 includes the vehicles 102, 104 (tanks in this example) and individuals 112, 114 (soldiers on foot) participating in the simulation. FIG. 2 further shows the central controller 110, which controls various aspects of the simulation via radio communications.

Figure 3A:
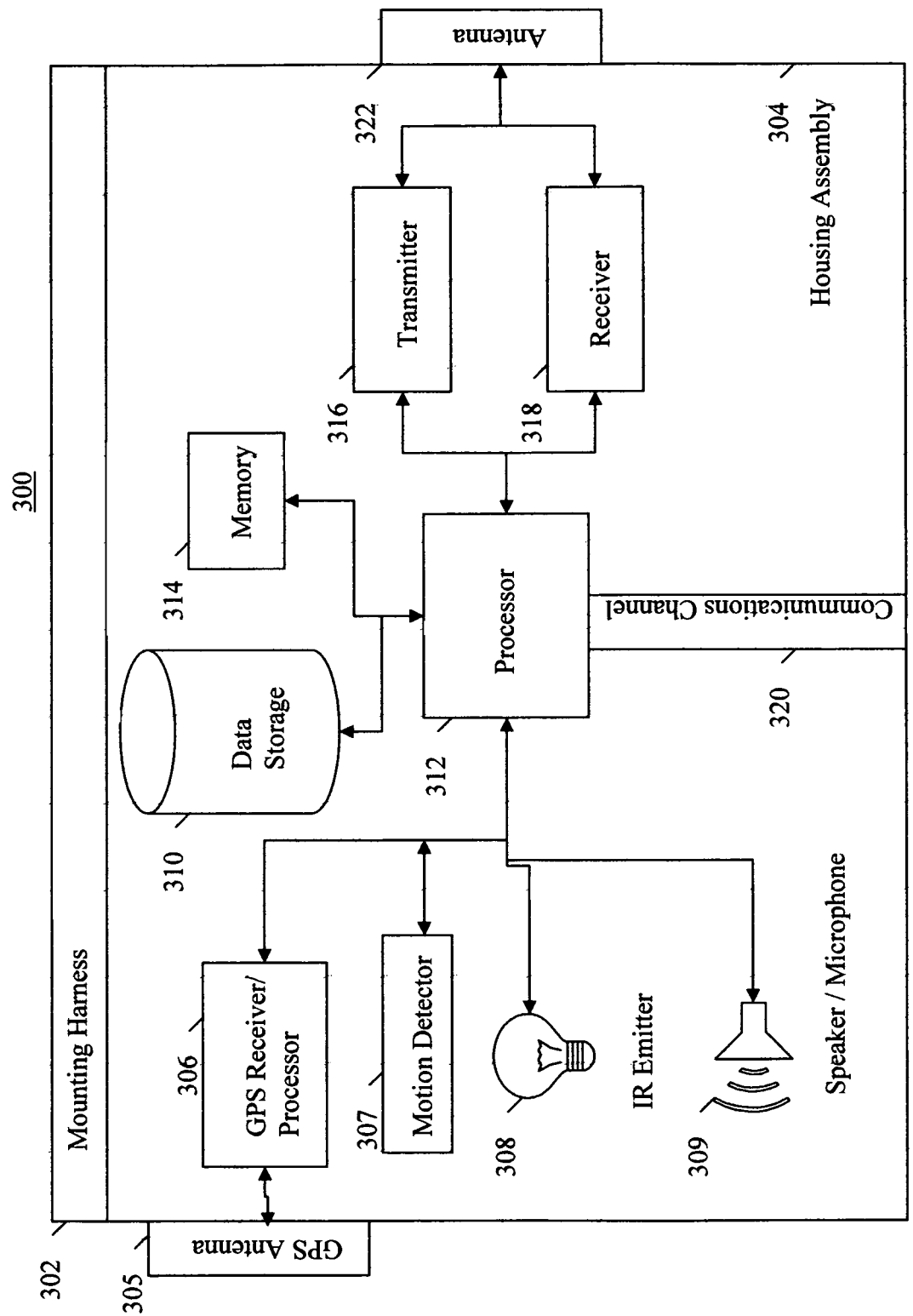
FIG. 3A is a block diagram showing the mobile simulation unit in one embodiment of the present invention.

FIG. 3A is a block diagram showing the mobile simulation unit 300 in one embodiment of the present invention. FIG. 3A shows the mobile simulation unit 300 of the present invention, used for receiving and transmitting signals from an individual or vehicle during the course of a simulation. The mobile simulation unit 300 is encased in a housing assembly 304 that may be constructed of plastic, a light metal such as aluminum, titanium, metal alloys, composite materials or any other material suitable for housing an electronic computing and radio system. The mobile simulation unit 300 further includes a mounting harness 302 that is used to mount the mobile simulation unit 300 onto an individual solider or a vehicle. A mounting harness 302 for an individual may include webbing or similar straps including Velcro enclosures that secure the harness 302 onto an individual.

FIG. 3A further shows that the mobile simulation unit 300 includes a central processor 312 that can be any well known commercial microprocessor such as the AMD Athlon 64 3000, the IBM PowerPC 970 or the Intel Pentium D 820. Connected to the central processor 312, the mobile simulation unit 300 also includes data storage 310, which may be any non-volatile data storage device, such as a hard drive, and a memory 314, which may be any volatile memory device, such as a random access memory (RAM) element. The data storage 310 and memory 314 are used to store and access data regarding messages or signals that are exchanged during the simulation or sounds that are recorded or emitted by speaker/microphone 309.

Also connected to the central processor 312 is an IR emitter 308 and a speaker/microphone 309. The IR transmitter 308 can be used to send IR signals during the simulation, as described above, such as when a simulated shot is fired. The speaker/microphone 309 is utilized to emit sounds of varying types, such as sound cues used during a military simulation, including sounds of explosions and shots. The speaker/microphone 309 is further utilized to record sounds during certain simulation events for storage.

Also connected to central processor 312 is a transmitter 316 and a receiver 318. The transmitter 316 is utilized to transmit RF signals via the antenna 322 during a simulation, as described more fully above with reference to FIG. 1. The receiver 318 is utilized to receive RF signals via the antenna 322 during a simulation. In short, the transmitter 316 and receiver 318 are used to communicate with the central controller 110, the vehicles 102-104 and players 112-114 in the simulation.

Also connected to central processor 312 is GPS receiver/processor 306 and GPS antenna 305. The GPS receiver/processor 306 is utilized to receive GPS RF signals via the antenna 305 during a simulation, as described more fully above with reference to FIG. 1. The GPS receiver/processor 306 is further utilized to process the GPS signals received via GPS antenna 305 and calculate the position of the mobile simulation unit 300, typically in terms of latitude and longitude. The position information can then be sent to processor 312 for transmission via transmitter 316 to central controller 110. Details as to when the mobile simulation unit 300 of the present invention calculates and transmits the position information is provided below with reference to FIGS. 5-7. Also shown is a motion detector 307 which may be utilized by GPS receiver/processor 306 or processor 312 to detect motion of the mobile simulation unit 300.

The communications channel 320 is a mechanism utilized by the central processor 312 to exchange information as an alternative to using the transmitter 316 and receiver 318. The communications channel 320 may be used to send or receive information over a static wired link, such as a USB port, an Ethernet port, an RS232 port or a serial port. In one embodiment of the present invention, the mobile simulation unit 300 may also include a battery pack (not shown) for powering the mobile simulation unit 300. In another embodiment of the present invention, the mobile simulation unit 300 may include a wired outlet or plug for coupling with a constant power source for powering the mobile simulation unit 300.

FIG. 3B is an illustration showing a perspective view of the GPS component 350 in one embodiment of the present invention. GPS component 350 corresponds to elements 305, 306 of FIG. 3A. FIG. 3B shows the GPS antenna 352 which may be a helix antenna encased in a cylindrical housing assembly. Also shown is the GPS receiver/processor 354 which may also be encased in a housing assembly. The GPS receiver/processor 354 receives GPS RF signals via the antenna 352 and processes the GPS signals received so as to calculate the position of the mobile simulation unit 300. The position information can then be sent to processor 312 via wire or conduit 356 that terminates at a connector 358, which may be coupled to the processor 312. In one embodiment of the present invention, the GPS component 350 can be any one of the GeoHelix line of GPS antennas available from Sarantel, PLC of Wellingborough, Great Britain.

Figure 4:
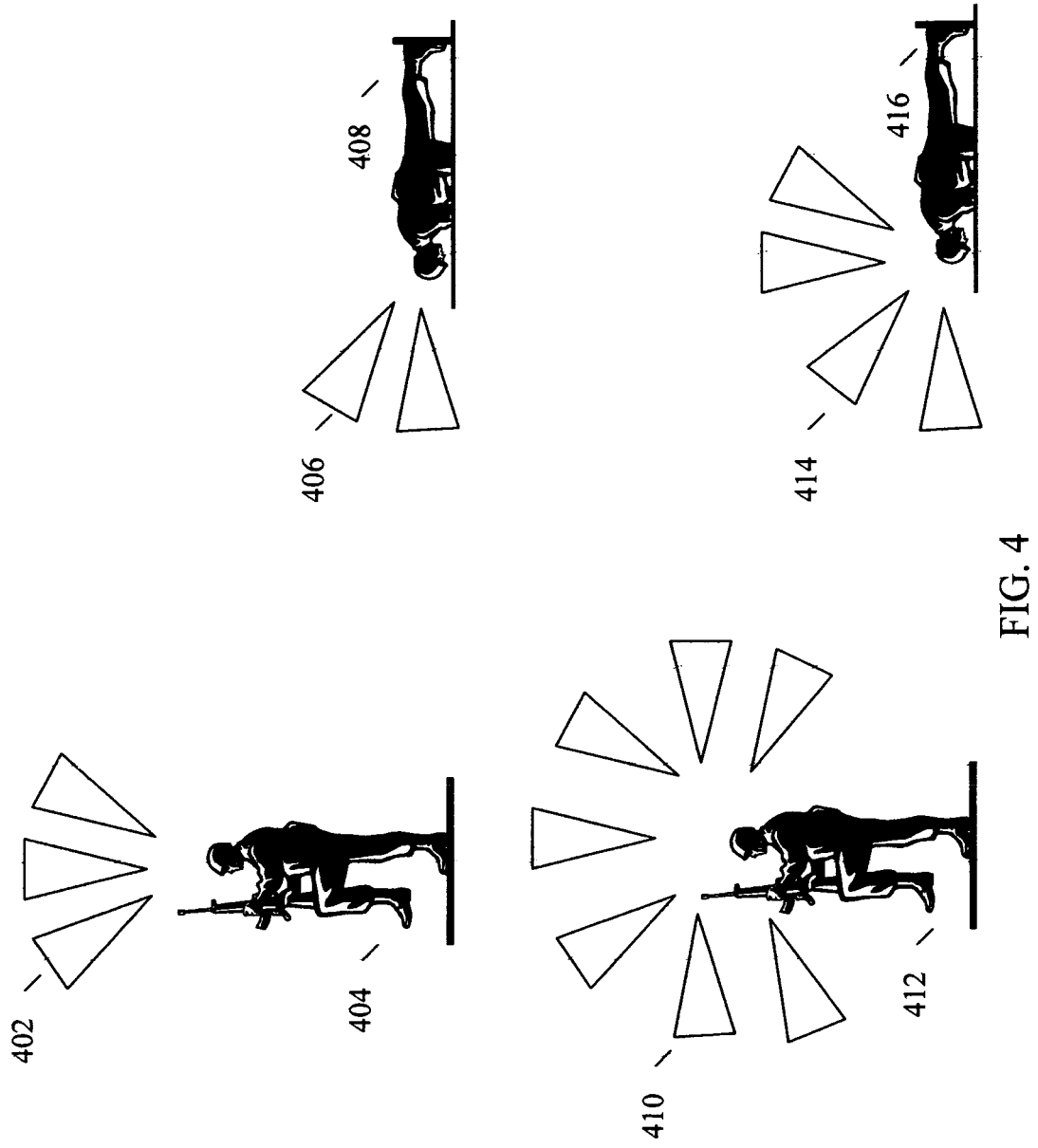
FIG. 4 is an illustration showing use of the GPS component in one embodiment of the present invention.

FIG. 4 is an illustration showing use of the GPS component 350 of FIG. 3B in one embodiment of the present invention. FIG. 4 shows a soldier or player 404 standing in an upright position and using a conventional GPS antenna. Where the arrows 402 indicate the direction from which GPS RF signals may be received on the individual's antenna, the figure shows that in an upright position the mobile simulation unit of the soldier 404 receives GPS RF signals from about a ninety degree swath of the sky. FIG. 4 further shows a soldier 408 standing in a prone or lying position and using a conventional GPS antenna. Where the arrows 406 indicate the direction from which GPS RF signals may be received on the individual's antenna, the figure shows that in a prone position the mobile simulation unit of the soldier 406 receives GPS RF signals from about a forty-five degree swath of the sky. Thus, in a prone position the solider 408 has lost the ability to receive signals from that area of the sky directly above him.

FIG. 4 further shows a soldier 412 standing in an upright position and using a GPS antenna as described with reference to mobile simulation unit 300, in one embodiment of the present invention. The arrows 410 show that in an upright position the mobile simulation unit 300 of the soldier 412 receives GPS RF signals from about a two hundred and seventy degree swath of the sky—a marked improvement from the ninety degree swath of soldier 404. FIG. 4 further shows a soldier 414 standing in a prone or lying position and the GPS antenna of mobile simulation unit 300. The arrows 414 show that in a prone position the mobile simulation unit 300 of the soldier 416 receives GPS RF signals from about a one hundred and thirty-five degree swath of the sky—a marked improvement from the forty-five degree swath of soldier 408. Thus, the use of the GPS antenna of mobile simulation unit 300 increases the ability of a mobile simulation unit to receive signals from greater portions of the sky.

Figure 5:
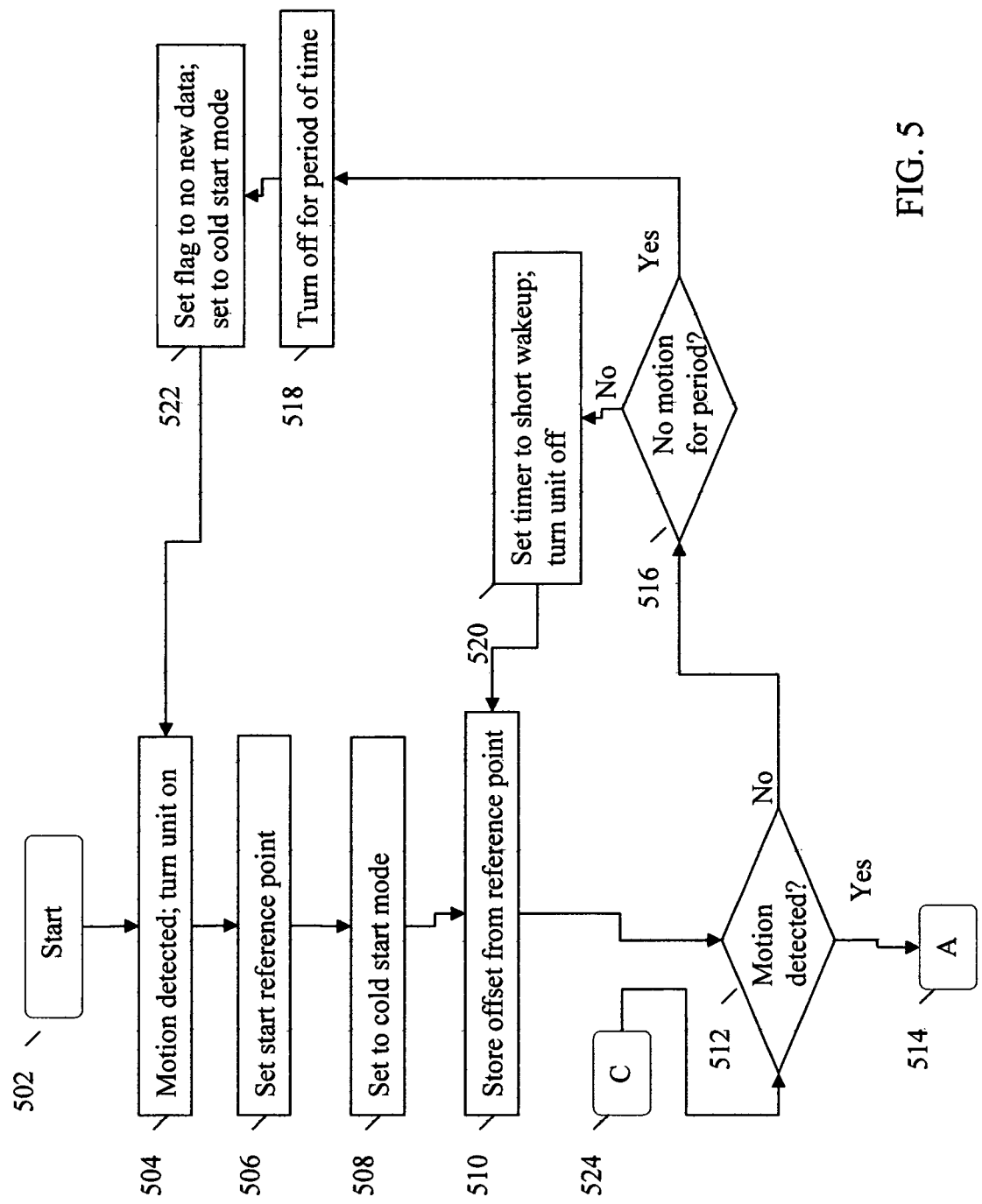
FIG. 5 is a flow chart depicting the control flow of the motion detection and power sequence process that takes place within a mobile simulation unit, according to one embodiment of the present invention.

FIG. 5 is a flow chart depicting the control flow of the motion detection and power sequence process that takes place within a mobile simulation unit 300, according to one embodiment of the present invention. The flow chart of FIG. 5 shows how the GPS component (such as elements 305, 306) of the mobile simulation unit 300 turns on and off and sets start modes in response to movement of the mobile simulation unit 300.

The control flow of FIG. 5 begins with step 502 and proceeds immediately to step 504. In step 504, motion of the mobile simulation unit 300 is detected, such as via the motion detector 307, and the GPS component is turned on or powered up. In step 506 a start reference point is set to the last position calculated by the mobile simulation unit 300. In step 508, the GPS component is set to start in cold start mode. A GPS device can be started in various modes. Cold start mode refers to a mode wherein the GPS device has not been turned on for a long period of time, or the GPS device has moved a great distance from the last position calculation of the device. Hot start mode refers to a mode wherein the GPS device has been turned off for a very short period of time and the GPS device is in the same or near the last position calculation of the device. Warm start mode lies between cold start and hot start and refers to a mode wherein the GPS device has not been turned off for a long period of time, and the GPS device has not moved a great distance from the last position calculation of the device.

In step 510, the mobile simulation unit 300 stores the offset from the reference point, or calculates a distance from the last reference point. In step 512, it is determined whether motion of the mobile simulation unit 300 continues to be detected. If the result of this determination is positive, control flows to step 514. Otherwise, control flows to step 516. In step 516, it is determined whether no motion has been detected for a predetermined period of time, thereby meriting cold start mode. If the result of this determination is positive, control flows to step 518. Otherwise, control flows to step 520.

In step 520, a timer is set to wakeup in a predetermined short period of time and the GPS component is turned off. In step 518, the GPS component is turned off for a predetermined period of time. In step 522, a flag is set to "no new data," which indicates no new position data has been calculated, and the GPS component is set to cold start mode. Subsequently, control flows back to step 504.

Figure 6:
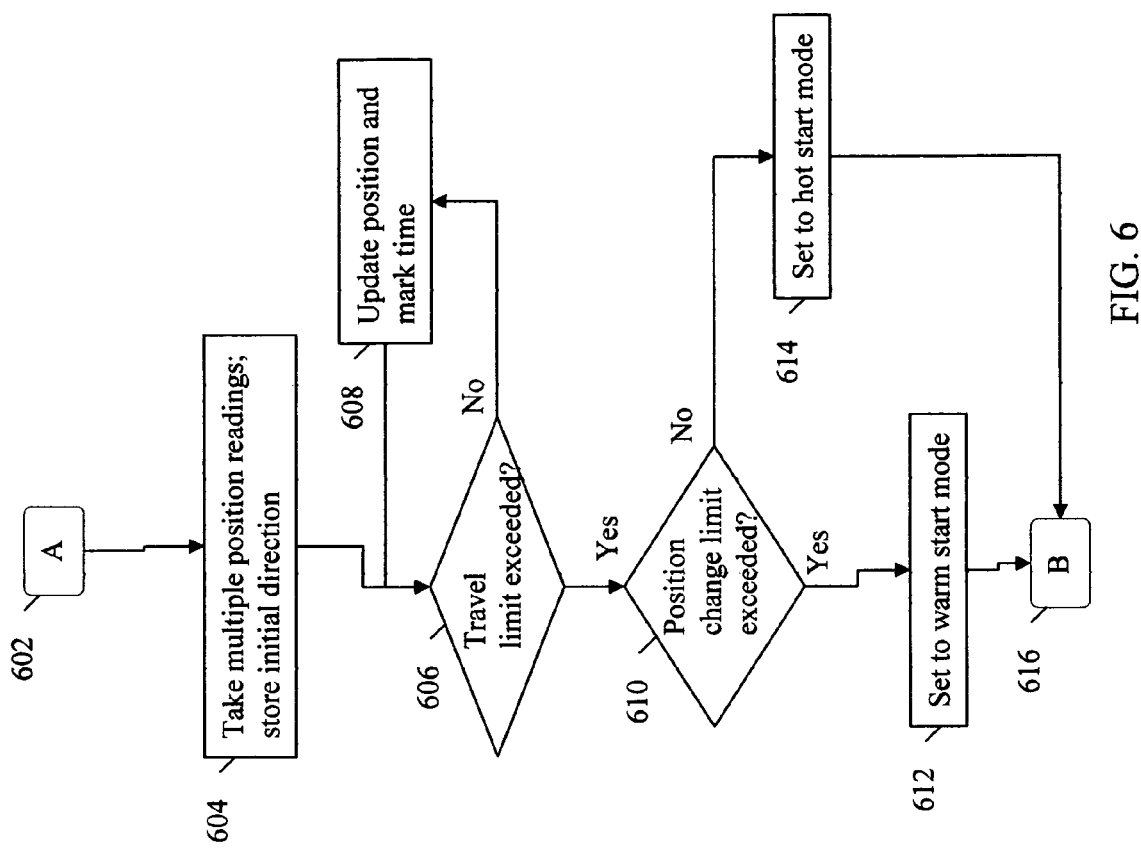
FIG. 6 is a flow chart depicting the control flow of the travel testing process that takes place within a mobile simulation unit, according to one embodiment of the present invention.

FIG. 6 is a flow chart depicting the control flow of the travel testing process that takes place within a mobile simulation unit 300, according to one embodiment of the present invention. The flow chart of FIG. 6 shows how the GPS component (such as elements 305, 306) of the mobile simulation unit 300 sets start modes in response to the amount of movement of the mobile simulation unit 300.

The control flow of FIG. 6 begins with step 602 (originating from step 514 in the control flow of FIG. 5) and proceeds immediately to step 604. In step 604, multiple position readings are calculated by the GPS component and an initial direction is calculated based on the position readings. In step 606, it is determined whether a travel limit, i.e., a predetermined distance that overshadows inherent GPS position error, has been exceeded. If the result of this determination is positive, control flows to step 610. Otherwise, control flows to step 608 wherein the latest position calculation and the current time are noted for future calculations and control flows back to step 606. In step 610, it is determined whether a position change limit, i.e., a predetermined distance that may affect the ability of the GPS component to take a position reading, has been exceeded. If the result of this determination is positive, control flows to step 612. Otherwise, control flows to step 614.

In step 612, the GPS component is set to warm start mode. In step 614, the GPS component is set to hot start mode.

Figure 7:
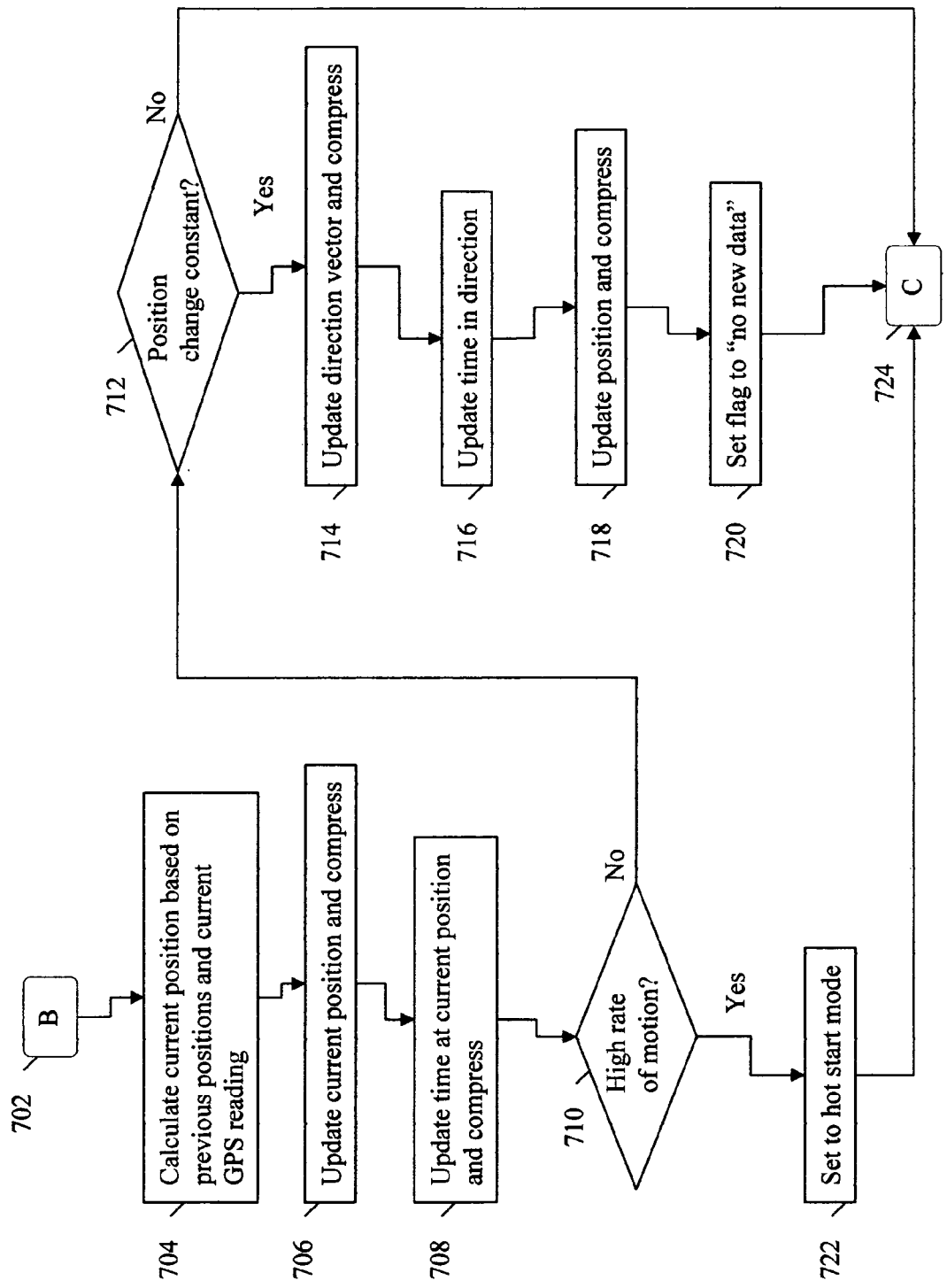
FIG. 7 is a flow chart depicting the control flow of the data compression process that takes place within a mobile simulation unit, according to one embodiment of the present invention.

FIG. 7 is a flow chart depicting the control flow of the data compression process that takes place within a mobile simulation unit 300, according to one embodiment of the present invention. The flow chart of FIG. 7 shows how the GPS component (such as elements 305, 306) of the mobile simulation unit 300 calculates, compresses and transmits position data.

The control flow of FIG. 7 begins with step 702 and proceeds immediately to step 704. In step 704, the current position of the mobile simulation unit 300 is calculated based on previous positions and the current GPS reading. In step 706, the current calculated position is updated based on step 704 and compressed. In step 708, the current time at the current position is updated and compressed. In an optional step after 708, the mobile simulation unit 300 transmits the current compressed time and position over RF to the central controller 110.

In step 710, it is determined whether a high rate of motion of the mobile simulation unit 300 is detected. If the result of this determination is positive, control flows to step 722. Otherwise, control flows to step 712. In step 722, the GPS component is set to hot start mode and control flows to step 724.

In step 712, it is determined whether the position change of the mobile simulation unit 300 is constant over a predetermined period of time. If the result of this determination is positive, control flows to step 714. Otherwise, control flows to step 724. In step 714, the direction vector is calculated and compressed. Next, in step 716 the time during which the mobile simulation unit 300 has been heading in the constant direction is updated. Then, in step 718 the current position of the mobile simulation unit 300 is updated and compressed. Lastly, a flag indicating "no new data" is set in step 720. In an optional step after 720, the mobile simulation unit 300 transmits the current compressed time and position over RF to the central controller 110.

The present invention can be realized in hardware, software, or a combination of hardware and software. An apparatus 300 according to a preferred embodiment of the present invention can be realized in a centralized fashion in one processor, or in a distributed fashion where different elements are spread across several processors. Any kind of information processing system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which, when loaded in a computer system, is able to carry out these methods. Computer program means or computer program in the present context mean any expression, in any language, code or notation, of a set of instructions intended to use a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, which allow a computer system to read such computer-readable information.

Figure 8:
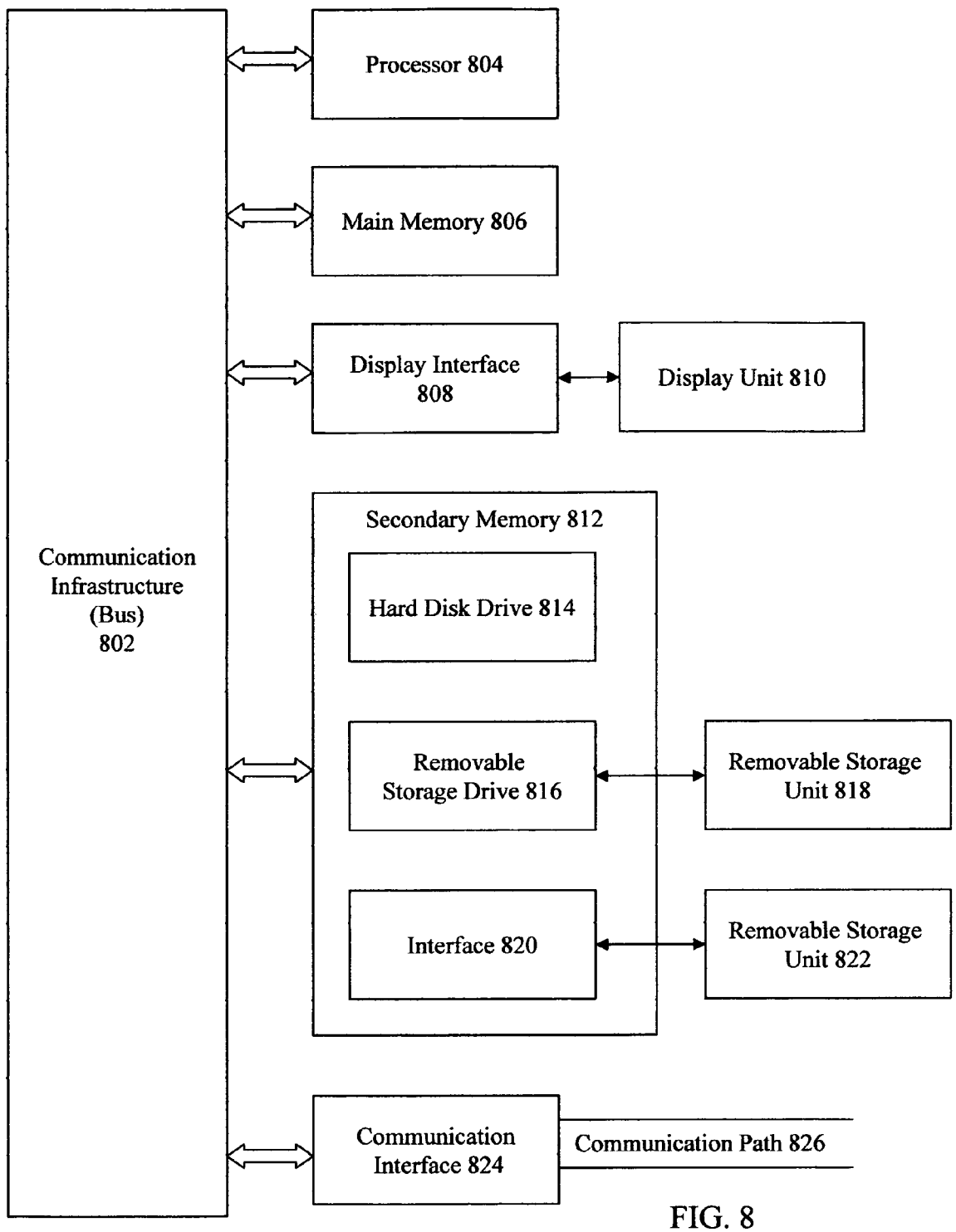
FIG. 8 is a high level block diagram showing an information processing system useful for implementing one embodiment of the present invention.

FIG. 8 is a high level block diagram showing an information processing system useful for implementing one embodiment of the present invention. The computer system includes one or more processors, such as processor 804. The processor 804 is connected to a communication infrastructure 802 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 808 that forwards graphics, text, and other data from the communication infrastructure 802 (or from a frame buffer not shown) for display on the display unit 810. The computer system also includes a main memory 806, preferably random access memory (RAM), and may also include a secondary memory 812. The secondary memory 812 may include, for example, a hard disk drive 814 and/or a removable storage drive 816, representing a floppy disk drive, a magnetic tape drive, an optical disk drive, etc. The removable storage drive 816 reads from and/or writes to a removable storage unit 818 in a manner well known to those having ordinary skill in the art. Removable storage unit 818, represents a floppy disk, a compact disc, magnetic tape, optical disk, etc. which is read by and written to by removable storage drive 816. As will be appreciated, the removable storage unit 818 includes a computer readable medium having stored therein computer software and/or data.

In alternative embodiments, the secondary memory 812 may include other similar means for allowing computer programs or other instructions to be loaded into the computer system. Such means may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to the computer system.

The computer system may also include a communications interface 824. Communications interface 824 allows software and data to be transferred between the computer system and external devices. Examples of communications interface 824 may include a modem, a network interface (such as an Ethernet card), a communications port, a PCMCIA slot and card, etc. Software and data transferred via communications interface 824 are in the form of signals which may be, for example, electronic, electromagnetic, optical, or other signals capable of being received by communications interface 824. These signals are provided to communications interface 824 via a communications path (i.e., channel) 826. This channel 826 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 806 and secondary memory 812, removable storage drive 816, a hard disk installed in hard disk drive 814, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, which allow a computer to read such computer readable information.

Computer programs (also called computer control logic) are stored in main memory 806 and/or secondary memory 812. Computer programs may also be received via communications interface 824. Such computer programs, when executed, enable the computer system to perform the features of the present invention as discussed herein. In particular, the computer programs, when executed, enable the processor 804 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A method on a computer unit for calculating and transmitting position data, comprising:
   monitoring motion of the unit;
   if motion of the unit is detected,
      initiating a start sequence of the unit, comprising:
         initiating a cold start sequence of the unit if an amount of time that has passed since a previous step of calculating position data is greater than a first threshold value;
         initiating a warm start sequence of the unit if the amount of time is less than the first threshold value but greater than a second threshold value;
         initiating a hot start sequence of the unit if the amount of time is less than a the second threshold value;
      calculating current position data of the unit using the Global Positioning System (GPS);
      calculating a difference between the current position data of the unit and a previous position data of the unit; and
      transmitting the current position data of the unit if the difference is greater than a threshold value.

2. The method of claim 1, further comprising:
   transmitting a message indicating that the unit has not moved, if motion of the unit is not detected during a predetermined period of time.

3. The method of claim 1, wherein the step of monitoring comprises:
   monitoring motion of the unit using a motion detector.

4. The method of claim 3, wherein the step of initiating comprises:
   initiating a cold start sequence of the unit if an amount of time that has passed since a previous step of calculating position data is greater than a first threshold value;
   initiating a warm start sequence of the unit if the amount of time is less than the first threshold value but greater than a second threshold value;
   initiating a hot start sequence of the unit if the amount of time is less than a the second threshold value.

5. The method of claim 3, wherein the first step of calculating comprises:
   calculating current position data of the unit using a plurality of previous position data and a current reading from the GPS.

6. The method of claim 5, further comprising a step before the step of transmitting of:
   compressing the current position data and a current time of the unit.

7. The method of claim 6, wherein the step of transmitting comprises:
   transmitting the current position data and the current time of the unit if the difference is greater than a threshold value.

8. The method of claim 5, further comprising a step before the step of transmitting of:
   determining a direction of the unit based on the current position data of the unit a plurality of previous position data.

9. The method of claim 8, further comprising a step before the step of transmitting of:
   compressing the current position data and the direction of the unit.

10. The method of claim 9, wherein the step of transmitting comprises:
    transmitting the current position data and the direction of the unit if the difference is greater than a threshold value.

* * * * *